United States Patent [19]

Artzi

[11] Patent Number: 4,708,035

[45] Date of Patent: Nov. 24, 1987

[54] SNOW CHAINS FOR VEHICLES

[76] Inventor: Gad B. Artzi, 11 Jabotinsky Street, Hadera, Israel

[21] Appl. No.: 875,594

[22] Filed: Jun. 18, 1986

[51] Int. Cl.$^4$ ............................................. B60C 27/06
[52] U.S. Cl. ................................................. 81/15.8
[58] Field of Search ......................................... 81/15.8

[56] References Cited

U.S. PATENT DOCUMENTS

| | | | |
|---|---|---|---|
| 3,099,928 | 8/1963 | Showers, Jr. | 81/15.8 |
| 3,585,883 | 6/1971 | Insam | 81/15.8 |
| 3,865,168 | 2/1975 | de Previnquieres | 81/15.8 |

Primary Examiner—Roscoe V. Parker

Attorney, Agent, or Firm—Toren, McGeady & Associates

[57] ABSTRACT

There is provided a device which facilitates the laying of snow chains onto vehicle wheels. The device comprises two U-shaped members one leg of which is shorter than the other one. These U-shaped members are preferably of square cross section. The longer of the two legs of one of the U-shaped members has a hollow end into which the leg of the other member can enter telescopingly. The device further comprises two rectangular eyes which are linked, one each to the ends of the snow chain. One of the eyes has linked to it a hook which can be inserted in a crosswise extending slot in a leg of a U-shaped member.

1 Claim, 4 Drawing Figures

SNOW CHAINS FOR VEHICLES

BACKGROUND OF THE INVENTION

The present invention relates to a device which will facilitate the placement and fixing of snow chains onto vehicle wheels.

Snow chains for vehicles are usually attached to the wheels of a car by placing them on the ground in front of the vehicle and thereafter the vehicle is driven thereon, finally the driver lifts the portions of the snow chain in front and behind the respective wheel and hooks both ends of the chain to one another.

This operation has two main drawbacks: first, the vehicle is not always in a position to be driven freely forward or backward, so to properly orientate the wheels relative to the chain on the ground, which might be due to the condition in which the vehicle had been parked or to weather conditions. Secondly, the operation of hooking up one end of the chain which is on the inside of the wheel is quite inconvenient and untidy.

OBJECT OF THE INVENTION

It is thus the object of the present invention to overcome the above disadvantages, namely, to provide a device which will facilitate the placement of such chains onto wheels in a quick, convenient and tidy manner without moving the vehicle.

SHORT SUMMARY OF DISCLOSURE

The device according to the invention comprises two U-shaped members, one leg of one of said U-shaped members being longer than the second leg, the end of one leg of both said members being bifurcated, the plane in which the tines of the bifurcated end of one member leg extend is crosswise relative to such plane of the bifurcated end of the leg of the other U-shaped member, the said tines having longitudinally extending slits, the non bifurcated end of a leg of a U-shaped member being of reduced diameter, the respective leg of the other U-shaped member being hollow, thus permitting said reduced diameter end to enter thereinto.

BRIEF DESCRIPTION OF THE DRAWINGS

The invention will now be described with reference to the annexed drawings in which.

DESCRIPTION OF PREFERRED EMBODIMENT

Figure 1:
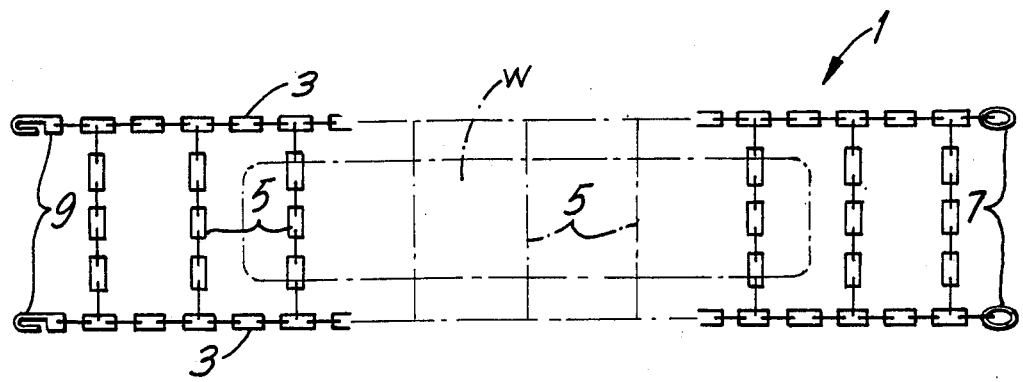
FIG. 1 illustrates schematically a snow chain.
Figure 4:
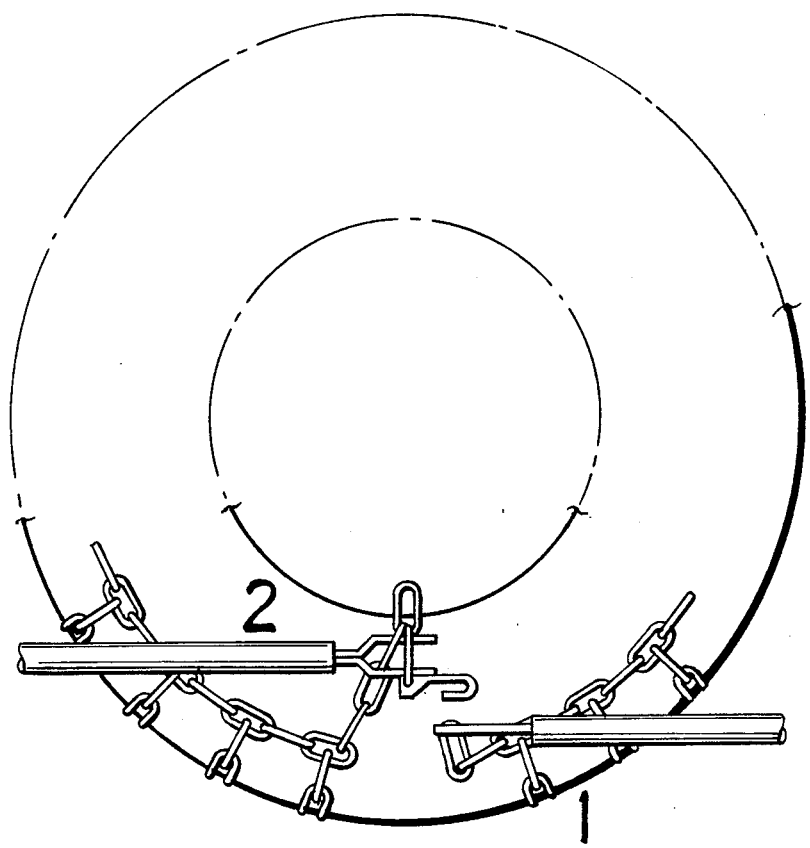
FIG. 4 illustrates schematically a wheel and part of a chain thereon.

Turning first to FIG. 1, a conventional snow chain 1 comprises two parallel lengthwise extending chains 3, which are interconnected by means of a plurality of crosswise chains 5. The ends of said lengthwise chains 3 are provided with eyes 7 and hooks 9. Conventionally in order to place such chains onto the wheels, the chains are spread in front of the wheels, and the vehicle is driven thereon with a wheel W approximately at the middle of the snow chain 1, then the hooks 9 are hooked onto eyes 7.

The new device which facilitates the "hooking" operation comprises (FIG. 2) two U-shaped members 10 and 11, one leg of said member 10 having a hollow end 10a being the "female" part while member 11 having a leg with an end 11a of reduced diameter being the "male" part.

Figure 2:
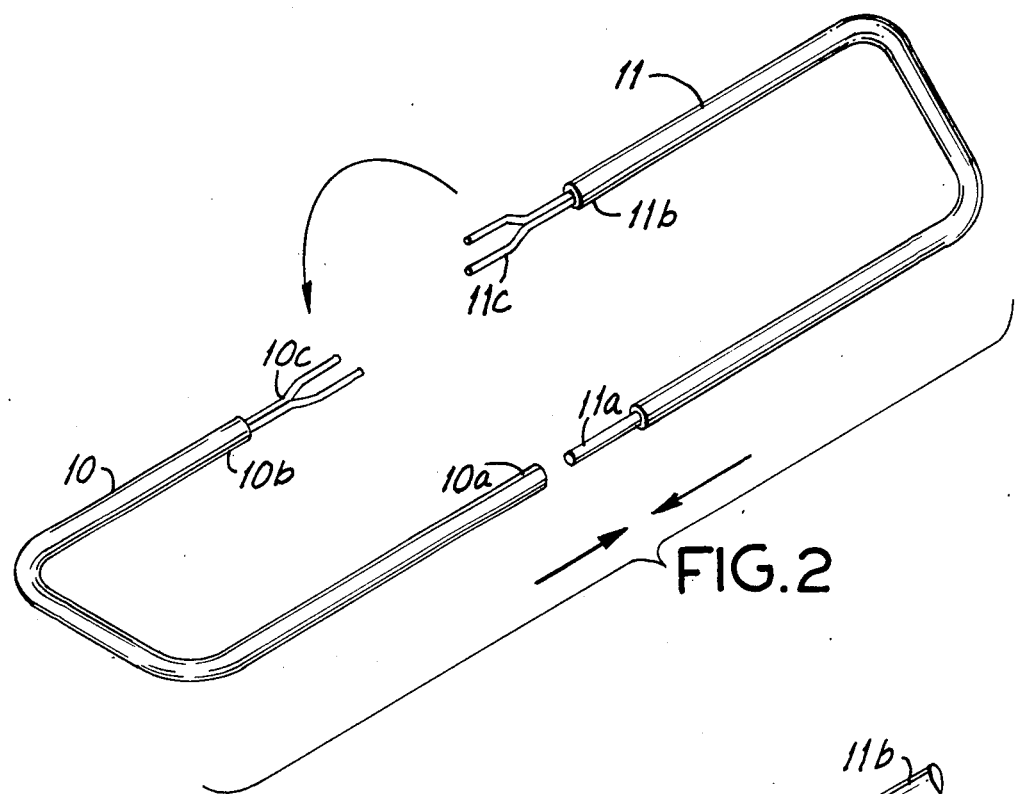
FIG. 2 illustrates the two main parts of the new device.

As can be seen in FIG. 2, the ends 10b and 11b respectively of members 10, 11 carry bifurcated end pieces 10c and 11c. End piece 10c is turned through 90° relative to end piece 11c.

Figure 3:
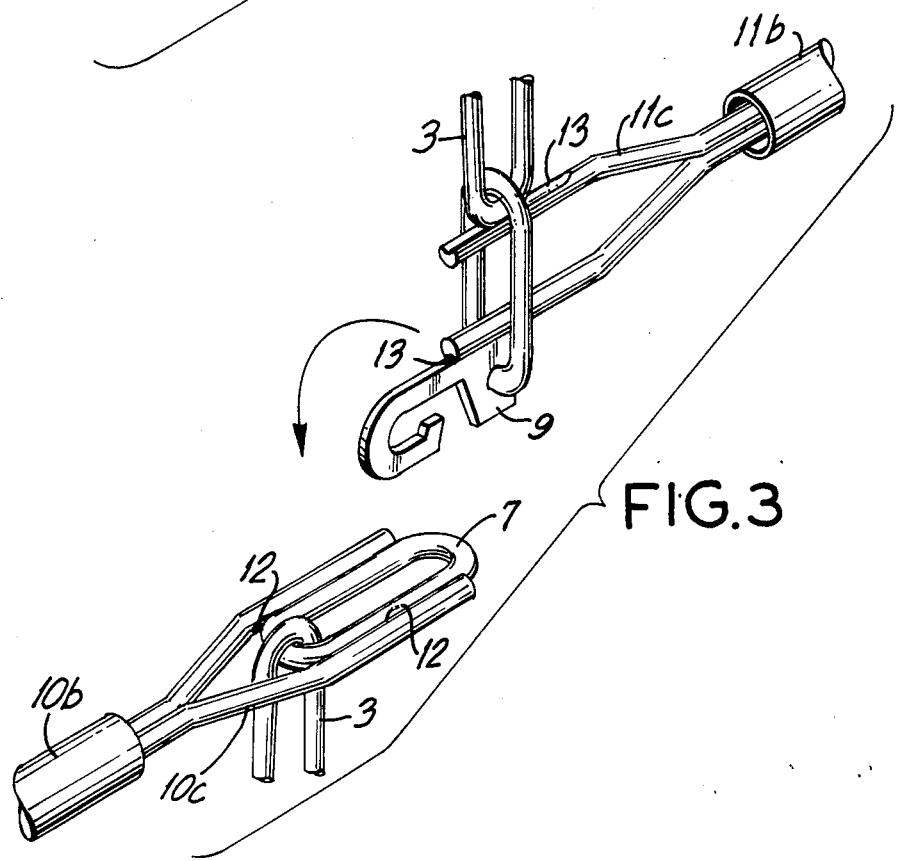
FIG. 3 is a perspective view of the ends of two oppositely disposed legs of U-shaped members.

As can be seen in FIG. 3, chains 3 of a conventional snow chain are provided with a hook 9.

Both tines of end piece 10c have a sidewise inwardly facing slit 12 which can accommodate and hold one link of chain 3. Equally the two tines of end piece 11c have—both outwardly facing slits 13, in operative position (FIG. 3) the upward one accommodating a link of a chain 3, and the downwardly facing one accommodating the edge of hook 9.

The operation of placing the chain and hooking up is conducted in the following manner:

Chain 1 is placed onto the wheel at its upper side and is laid around the wheel until the two ends of the chain are near one another near the lowermost point of the circumference of the wheel, then an eye 7 is slid into position between the tines 10c of end piece 10b, resting in the two oppositely disposed slits 12 which face one another. The opposite end of the same chain—with its outermost link—is slipped onto bifurcated member 11c with the bow of the next following link entering slit 13 and the edge of hook 9 entering slit 13 which faces downwardly (FIG. 3).

Forcing the members 10, 11 towards one another, as far as end 11a can enter end 10a, while this movement is performed the ends of members 10, 11 are not at the same level, but 11b is slightly above 10b; however, slight rotational movement of member 11 is possible turning on the end position 11a. Such movement brings hook 9 into engagement with eye 7, the hook simply snaps onto eye 7.

In this way the opposite ends of the snow chain are conveniently connected to one another.

It can be seen that by employing this device snow chain can easily and quickly be put on no matter how the respective vehicle is positioned.

I claim:

1. A device for use in placing and fixing snow chains onto the wheels of a vehicle where the snow chains have links at one end and hooks at the other end, said device comprises a first and a second U-shaped member, each said U-shaped member comprises a first leg and a second leg in laterally spaced relation with said first and second legs having a free end and a connected end, said free end of each of said first legs is bifurcated having a pair of laterally spaced tines, said free end of said second leg of said first U-shaped member being hollow and said free end of said second leg of said second U-shaped member having a reduced diameter compared to the remainder of said second leg so that said reduced diameter fits into the hollow free end, when said reduced diameter second leg fits into said hollow free end of the other second leg and said U-shaped members are positioned for connecting the ends of the snow chains the tines of the first leg of said first U-shaped member are located in a plane extending transversely of a plane containing the tines of the first leg of said second U-shaped member, said tines of said first leg of said first U-shaped member having slits extending in the direction of said tines with said slits facing toward one another and said tines of said first leg of said second U-shaped member having slits extending in the direction of said tines with said slits facing away from one another whereby the slits in said tines in the first leg of said first U-shaped member are arranged to receive a link at one end of the snow chain and the slits in the tine in the first leg of the second U-shaped member are arranged to receive a hook and a link at the other end of the snow chain for interconnecting the link received by the first U-shaped member to the hook received by the second U-shaped member.

* * * * *